(12) United States Patent
Ma et al.

(10) Patent No.: US 8,705,887 B2
(45) Date of Patent: Apr. 22, 2014

(54) METHOD AND APPARATUS FOR FILLING IN OR REPLACING IMAGE PIXEL DATA

(75) Inventors: Zhenkui Ma, Kent, WA (US); Guy McWethy, Renton, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 1038 days.

(21) Appl. No.: 12/197,164

(22) Filed: Aug. 22, 2008

(65) Prior Publication Data
US 2010/0046843 A1 Feb. 25, 2010

(51) Int. Cl.
G06K 9/40 (2006.01)

(52) U.S. Cl.
USPC .......................................... 382/275

(58) Field of Classification Search
USPC ............................. 382/167, 274, 275
See application file for complete search history.

(56) References Cited

U.S. PATENT DOCUMENTS

| | | | |
|---|---|---|---|
| 6,281,904 B1 | 8/2001 | Reinhardt et al. | |
| 6,295,115 B1 * | 9/2001 | Zhang et al. | 355/32 |
| 6,594,401 B1 | 7/2003 | Metcalfe et al. | |
| 7,260,273 B2 | 8/2007 | Sellers et al. | |
| 8,270,764 B1 * | 9/2012 | Agarwala et al. | 382/284 |
| 2005/0219391 A1 * | 10/2005 | Sun et al. | 348/255 |
| 2005/0275734 A1 * | 12/2005 | Ikeda | 348/239 |
| 2006/0001690 A1 * | 1/2006 | Martinez et al. | 347/19 |
| 2006/0114358 A1 * | 6/2006 | Silverstein et al. | 348/616 |
| 2006/0210191 A1 * | 9/2006 | Silverstein | 382/275 |
| 2007/0046687 A1 | 3/2007 | Soroushi et al. | |
| 2008/0284859 A1 * | 11/2008 | Lee | 348/208.1 |
| 2009/0190809 A1 * | 7/2009 | Han et al. | 382/128 |
| 2013/0094704 A1 * | 4/2013 | Hamadeh et al. | 382/103 |

OTHER PUBLICATIONS

Maxwell, S.K., et al., "A Multi-Scale Segmentation Approach to Filling Gaps in Landsat ETM+SLC-Off Images," International Journal of Remote Sensing, 28:23, 5339-5356, Apr. 11, 2007, <http://www.informaworld.com/smpp/title-content=713722504>.

Phase 2 Gap-Filled Algorithm, "SLC-Off Gap-Filled Products—Gap-Fill Algorithm Methodology," USGS, <http://landsat.usgs.gov/tools_L7SLCGapFilledMethod.pdf> [retrieved Oct. 24, 2007].

Scaramuzza, P., et al., "SLC Gap-Filled Products-Phase One Methodology," USGS, <http://landsat.usgs.gov/products_SLC_Gap_Fill_Methodology.pdf> [retrieved Mar. 18, 2004].

* cited by examiner

*Primary Examiner* — Yubin Hung
(74) *Attorney, Agent, or Firm* — Perkins Coie LLP (57) ABSTRACT

A system for filling in and/or replacing pixel data in a target image uses pixel data from a source image. In one embodiment, the pixel data in the source image are classified and boundaries of local class areas or groups of similarly classified pixels are determined. The pixel data in the local class areas are compared to determine one or more scaling factors. The missing pixel data or data to be replaced in the target image is obtained from the source image and scaled with the one or more scaling factors.

2 Claims, 10 Drawing Sheets

*Fig.1.*

TARGET IMAGE
*Fig.2A.*

SOURCE IMAGE
*Fig.2B.*

GAP FILLED
TARGET IMAGE
*Fig.2C.*

TARGET IMAGE

Fig.3A.

SOURCE IMAGE

METHOD AND APPARATUS FOR FILLING IN OR REPLACING IMAGE PIXEL DATA

FIELD

The technology disclosed herein relates to image processing techniques.

BACKGROUND

In the field of remote sensing, aerial and/or satellite images of terrain are studied to determine information about the land that is imaged. For example, in the forest products industry, aerial or satellite images of timberlands are used because the lands are often too vast or remote to access and survey on foot. The images of the timberlands may be analyzed to determine such information as the boundaries of a forest, the age of the trees in the forest, the types of trees in the forest, and a variety of other information.

In some cases, digital, aerial, or satellite images of terrain will contain missing pixel data. For example, a well-publicized mechanical failure on the Landsat 7 satellite causes images to be produced with bands of missing pixel data. Similarly, the terrain depicted in an aerial or satellite image may be fully or partially obscured by clouds, shadows, or other phenomena, thereby making it difficult to analyze.

Most commonly, images with missing pixel data or data that does not show what is desired are corrected with pixel duplication techniques whereby the pixel data to be filled in or replaced are obtained from the image itself and are assumed to be similar to the data for neighboring good pixels. However, such techniques often produce poorly-corrected images. Therefore, there is a need for a technique that can fill in missing pixel data and/or replace pixel data that produces a better approximation of how the underlying object or terrain in an image actually appears.

SUMMARY

To address the problems discussed above, the technology disclosed herein relates to a method and apparatus for modifying pixel data by filling in missing pixel data and/or replacing pixel data in an image. In accordance with one embodiment, a target image with missing pixel data or pixel data representing an obscured object is replaced with pixel data from a source image showing the same object or terrain. The source image may be obtained at a different time than the target image and may be obtained with a different imaging system. The source image and target image are aligned and the source image is re-sampled, if required, to have the same resolution as the target image. Pixel data from the source image are classified into groups and the boundaries of local areas of similarly classified pixels are determined. Pixel data in the target image are filled in and/or replaced by the corresponding pixel data in the source image that are adjusted by one or more scaling factors.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed technology will become more readily appreciated as the same become better understood by reference to the following detailed description, when taken in conjunction with the accompanying drawings, wherein.

DETAILED DESCRIPTION

As indicated above, the disclosed technology relates to a method and apparatus for filling in missing pixel data or replacing pixel data in a target image. Although the technology is described with respect to aerial and satellite images of terrain, it will be appreciated that the disclosed technology can be used to fill in missing pixel data and/or replace pixel data in any digital image.

Figure 1:
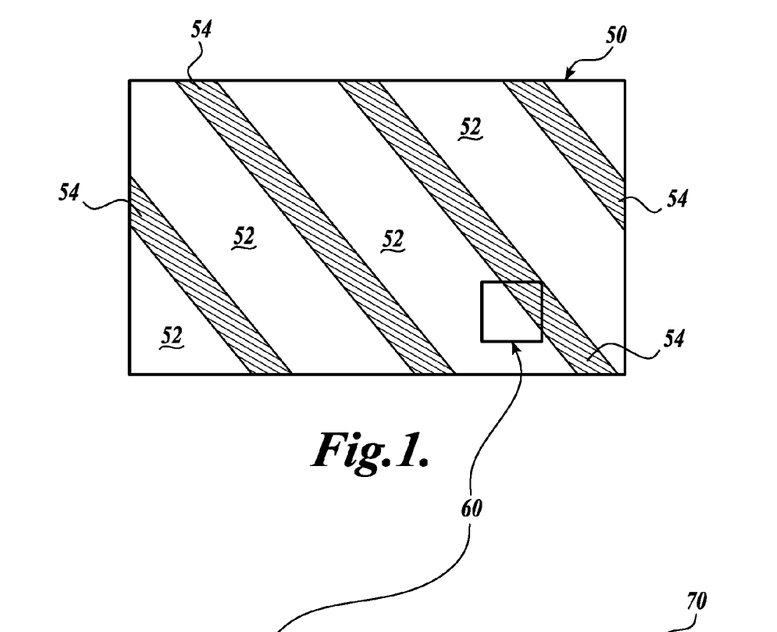
FIG. 1 diagrammatically illustrates a target Landsat 7 image with missing pixel data.

FIG. 1 illustrates a representative target image 50 that contains valid pixel data in a number of areas 52 and one or snore gaps 54 that are missing pixel data. In the case of Landsat 7 satellite images, a mechanical fault on the satellite produces images of terrain that contain gaps 54 of missing pixel data. In order to fill in the gaps in the target image, the disclosed technology replaces the missing pixel data with pixel data that are obtained from a source image of the same terrain.

Figures 2A, 2B, 2C:
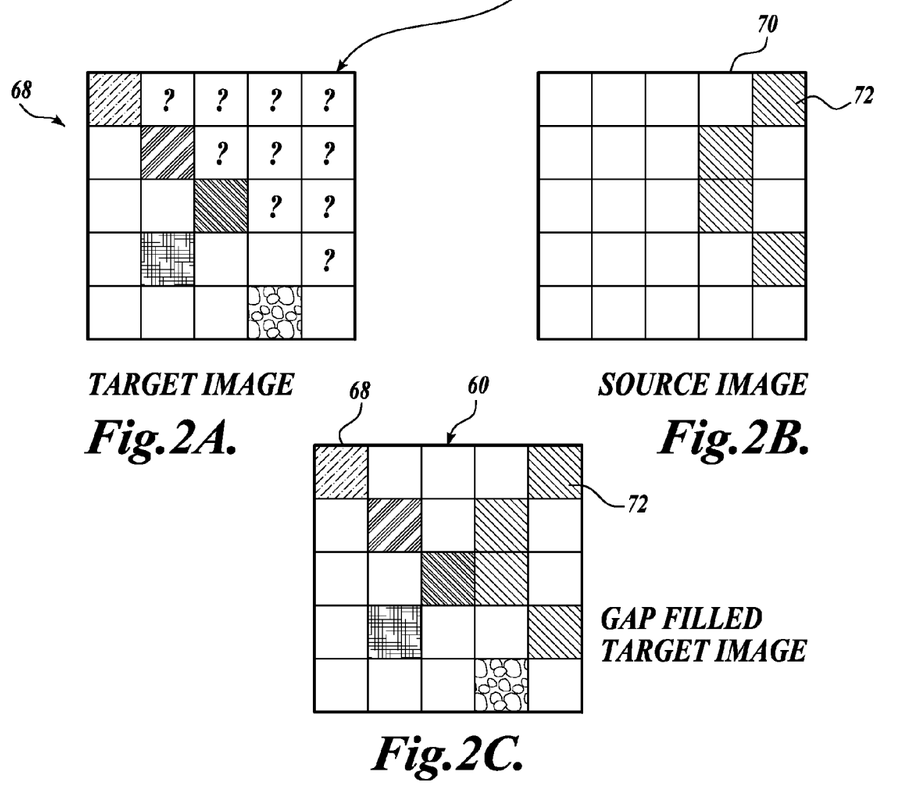
FIG. 2A represents a portion of the target image having valid and missing pixel data.
FIG. 2B represents a portion of a source image having valid pixel data.
FIG. 2C represents the portion of the target image shown in FIG. 2A that is filled with pixel data from the source image.

FIG. 2A shows a portion 60 of the target Landsat 7 image 50 having a number of pixels 68 with valid data, and a number pixels that are missing data as indicated by the question marks. To fill in the pixel data from corresponding pixels 72 in a source image 70 (shown in FIG. 2B) are used.

FIG. 2C shows the portion 60 of the target Landsat 7 image including the original pixels 68 with valid pixel data and pixels 72 with data that are obtained from the source image 70. With the missing pixel data added to the target image, the target image can be analyzed for its desired purpose.

The source image from which the missing pixel data are obtained may be captured at or about the same time that the target image is captured using a different imaging system. Alternatively, the source image may be captured at an earlier time than when the target image is captured using either the same or a different imaging system than the one used to obtain the target image. In most cases, the source image will be captured earlier than the target image, such that the target image represents the most recent image of the terrain in question. However, it is possible that a more recent image could be used as a source image to fill in missing pixel data or to replace pixel data in a previously-captured target image.

To fill in the missing pixel data or to replace pixel data in the target image, the pixel data of a source image are classified. Digital satellite and aerial image data typically contain values for each pixel in multiple spectral bands including one or more visible spectral bands, e.g., red, green, blue, and one or more infrared bands, e.g., near infrared $IR_1$, medium infrared $IR_2$, and far infrared $IR_3$. If an 8-bit imaging system is used, then the pixel value for each band can vary from 0-255. If there are 6 spectral bands, then the total number of different pixel data combinations is $256^6$. Classification serves to reduce the number of pixel combinations by identifying pixels in an image having similar spectral values. In one embodiment, a classifying engine, such as ERDAS from the Leica Corporation, can be used to classify pixel data into either a predefined number of classes or a varying number of classes where the pixel data values vary by no more than a user-specified amount from each other. The details of how to classify data are considered to be known to those of ordinary skill in the art and are therefore not discussed in further detail.

In one embodiment, the pixel data are classified into approximately 120 different classes. The pixels assigned to each class can be statistically analyzed to determine, for example, the mean or median value of the data in any spectral band, etc. The classifying engine also determines the boundaries of local areas or groupings of pixels having the same classification. Typically, if a classified pixel does not have a sufficient number of neighbors (e.g., <50) with the same classification, the pixel is re-classified.

Figure 3A:
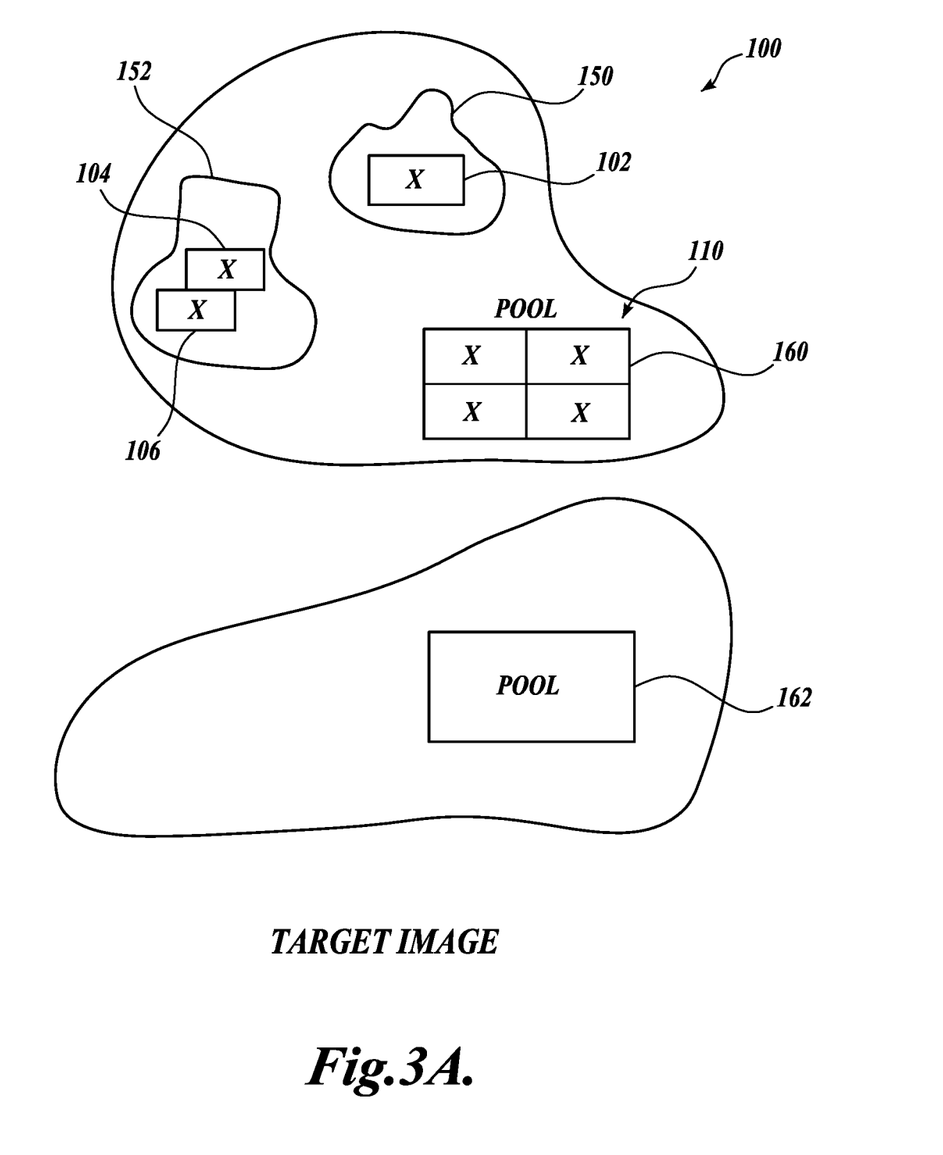
FIGS. 3A and 3B illustrate an example of how pixel data in a target image are filled and/or replaced in accordance with one embodiment of the disclosed technology.
Figure 3B:
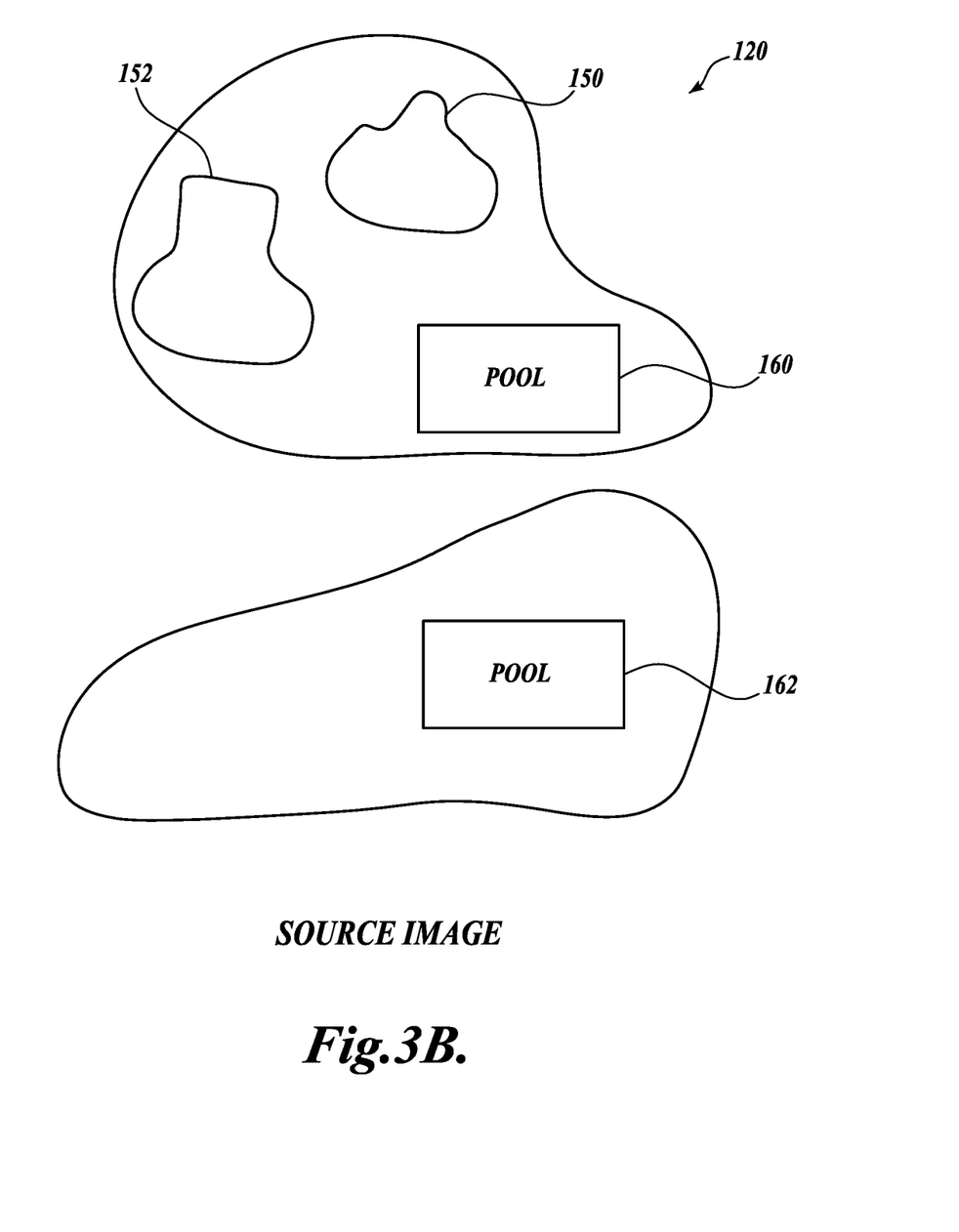

One embodiment of a technique for filling in missing pixel data in a target image in accordance with the disclosed technology is illustrated in FIGS. 3A and 3B. In the example shown, a target image 100 represents an urban back yard having areas of grass and a swimming pool. In the example shown, one area of grass is missing data for a single pixel 102, while a second area of grass is missing data for two pixels 104, 106. The target image 100 is also missing all data for the pixels 110 in the area of the swimming pool.

FIG. 3B illustrates a source image 120 of the same terrain that may have been obtained at a different time or with a different imager. The source image and the target image are aligned so that a pixel in the source image represents the same physical location as the corresponding pixel in the target image. In addition, the source image and the target image preferably have the same resolution. If the source and target images do not have the same resolution, then the source image may need to be re-sampled, as appropriate.

Each pixel in the source image is classified and the boundaries of local areas or groups of pixels with the same classification are determined. In the example shown, the source image has a first local class area 150 that represents the first grass patch and a second local class area 152 that represents the second grass patch. A local class area 160 includes pixels in the area of the swimming pool and a local class area 162 has pixels showing a neighboring swimming pool.

To fill in data for the missing pixels, such as pixel 102, the corresponding replacement pixel is found in the source image. To account for differences in the type of camera used to obtain the target and source image, the spectral bands of the source and target image are correlated. For example, the pixel data for the target image may have values for seven spectral bands, while the pixel data for the source image may only have values for four spectral bands. Therefore, the pixel data in the source and target images are correlated to determine which spectral band in one of the images corresponds the best to which spectral band in the other image. The data values for the spectral band having the best correlation coefficient in the source image are used to fill in or replace the data of the correlated spectral band in the target image.

To account for differences in the reflectance of the image that may occur between the time at which the source image is captured and when the target image is captured (e.g., the source image and target image may be captured at different times of year or under different lighting or weather conditions), a scaling factor representing a radiometric relationship between each spectral band to be Filled in or replaced is determined. In one embodiment, the scaling factors are computed by comparing pixel data in corresponding local class areas in the target image and source image. For example, the local class area 150 represents a grass patch in the source image 120. The boundaries of the local class area 150 in the source image define the corresponding boundaries of a group of pixels in the target image with which the scaling factors can be computed. For example, the scaling factors may be determined by comparing the mean values for pixel data in each spectral band in the boundaries of the local class area within the source and target images.

In the example shown, the mean values in each spectral band for the pixels that are within the local class area 150 that surrounds the pixel 102 are determined. The mean values of the data for each spectral band for the pixels in the local area 150 in the source image are also determined, and the mean values are compared. In one embodiment, the ratio of the means for each spectral band is used as the scaling factor.

As an alternative to using the ratio of the means, a regression equation may be built using corresponding pixels from both source and target images to define the radiometric relationship. The missing pixel data values for the target image can be predicted using this equation.

To fill in the missing data for the pixel 102, the data for the corresponding pixel in the source image is obtained and is scaled by the scaling factors. In the example shown, the data for the pixel in the source image that corresponds to the pixel 102 are obtained. The data for one spectral band, such as the red spectral band, are computed by taking the red spectral band data (or a different spectral band, if the different band correlates better) and multiplying it by the red spectral band scaling factor. Data for the other spectral bands of the pixel 102 are obtained and scaled in the same way.

In the example shown, the source image 120 may be taken in the early spring when the grass is dormant, while the target image 100 is taken in the summer. By scaling the spectral data by the scaling factors, the pixel data from the source image will more closely match the data for the pixels that surround pixel 102.

In some instances, there aren't enough valid pixels in a local class area of the target image to compute the scaling factors. If more than a user determined percentage (e.g., >90%) of pixels in a local class area are missing data or need to have the data replaced, then one embodiment of the disclosed technology uses a global class comparison to compute the scaling factors.

In the example of FIG. 3A, the data for the pixels 110 representing the swimming pool in the target image are all missing. However, the classifier has identified a local class area 160 that corresponds to the swimming pool in the target image. In addition, a local class area 162 has similarly classified pixels since the water in most swimming pools will generally look the same from the air. The boundaries of the local class area 162 in the source image define boundaries of a corresponding area 162 that contain a group of valid pixels in the target image. Therefore, the pixel data in the corresponding area 162 in the target image can be analyzed and compared with the pixel data for the pixels in the local class areas 160 and 162 in the source image to compute the scaling factors. If a local class area is relatively small, then a meaningful statistical comparison might not be accurate. In this case, the scaling factors can be determined by comparing the pixel data for all the similarly classified pixels in the source image with those in corresponding positions in the target image (a global class comparison). The data for the missing pixels 110 in the target image are determined by taking the spectral data for the corresponding pixels in the source image that are included in boundaries of the local class area 160 and scaling the data by the determined scaling factors.

Figure 4A:
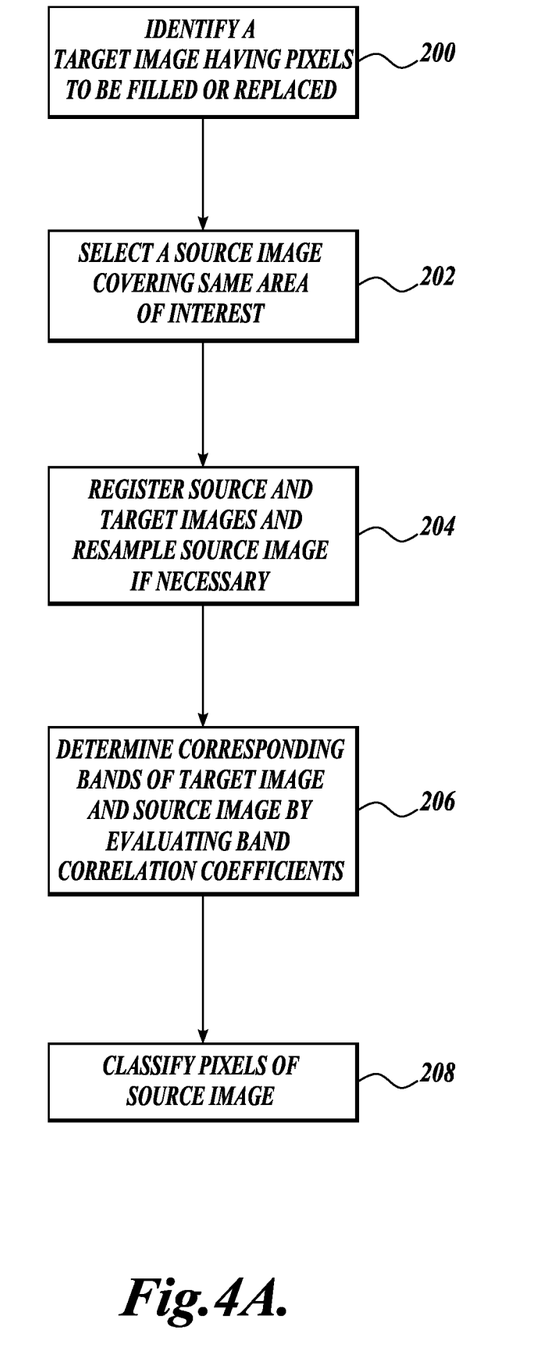
FIGS. 4A-4C illustrate a series of steps performed to fill in and/or replace pixel data in a target image in accordance with one embodiment of the disclosed technology.
Figure 4B:
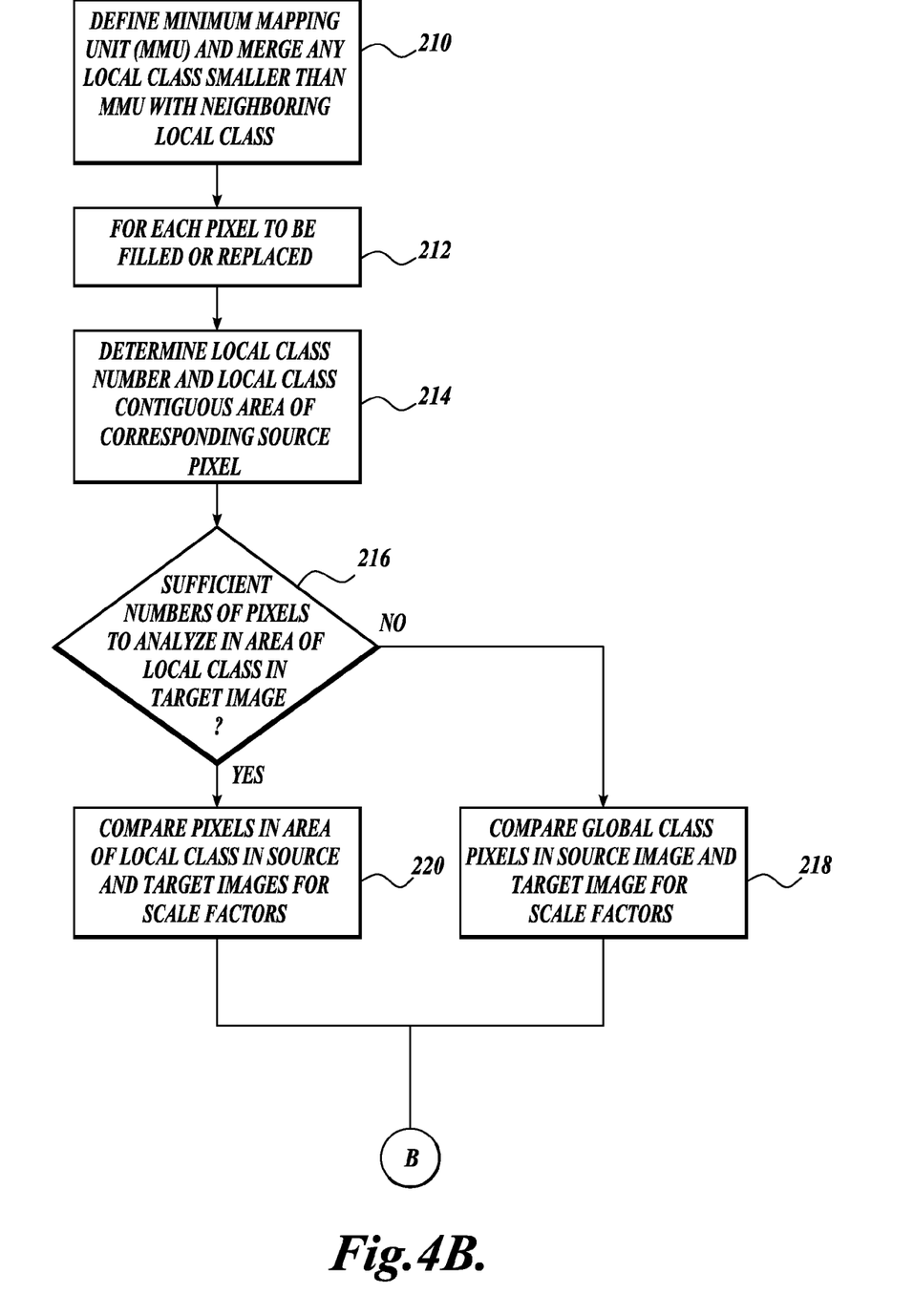
Figure 4C:
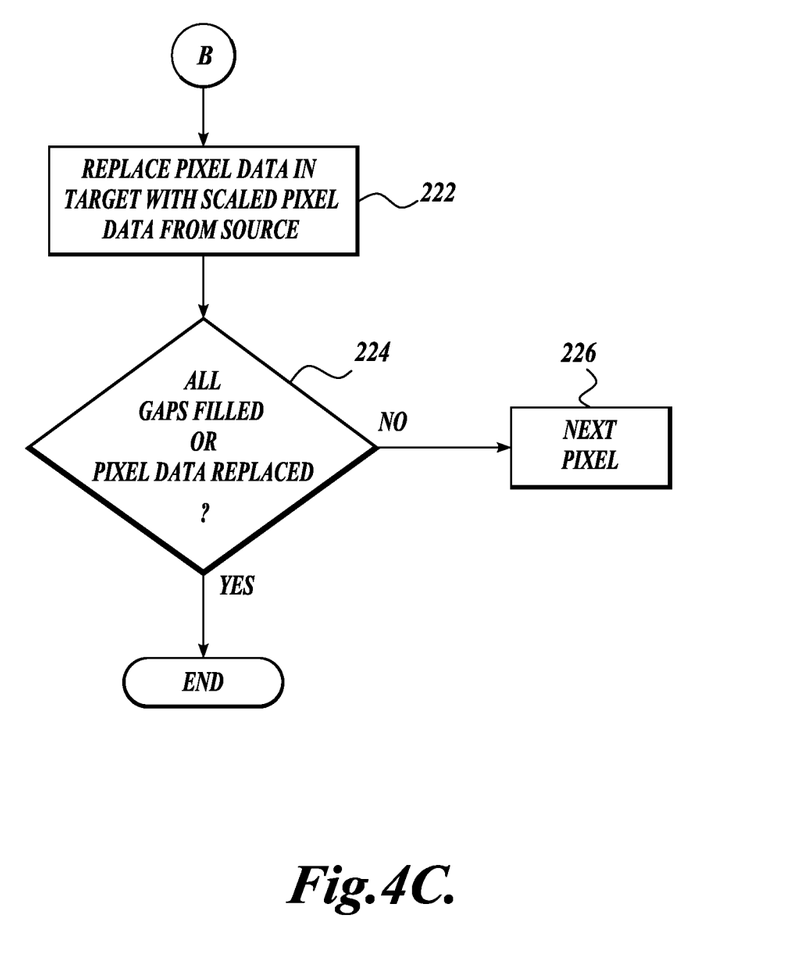

FIGS. 4A and 4C illustrate a series of steps performed to fill in missing pixel data and/or to replace pixel data for obscured portions of an image in accordance with one embodiment of the disclosed technology. Although the steps are set forth in a particular order for ease of discussion, it will be appreciated that the order may be changed or different steps performed in order to achieve the functionality described.

Beginning at 200, a target image that is missing pixel data or that has data to be replaced is selected. At 202, a source image covering the same area of interest (e.g., parcel of terrain) is selected. At 204, the target image and source image are registered so that pixels at the same position in the target and source images correspond to the same geographic location, in the case of images of terrain, or the same object or portion thereof, in the case of images of other things. In addition, the source image may be re-sampled to have the same resolution as the target image. The re-sampling may occur prior to the registration of the source and target image. Alternatively, the re-sampling may be done during the data filling operation. At 206, the corresponding spectral bands of the target image and the source image are determined based on calculated band correlation coefficients. At 208, the pixel data in the source image is classified, and the boundaries of the local class areas are determined.

Turning to FIG. 4B, a minimum mapping unit (MMU) or minimum size local area class is determined. The MMU may be determined as a percentage of the size of the source or target images or may be user selected. A local class area with a size that is less than the MMU is merged with a neighboring local class area at 210.

At 212, a loop begins processing each pixel in the target image to be filled or to have its data replaced.

At 214, a corresponding pixel in a source image is determined, including the source image pixel's class and the boundaries of its local class area. At 216, it is determined if there are a sufficient number of pixels to analyze in the corresponding local class area in the target image. If a local class area comparison can be made, the data for the pixels in the local class area in the target image are compared to the data for the pixels in the local class area in the source image in order to determine the scaling factors at 220.

If there are not enough valid pixels present in the local class area in the target image or if the local class area is too small, then a global class comparison of similarly classified pixels in the source and target images is made to determine the scaling factors at 218.

In FIG. 4C, the missing pixel data is filled in or replaced with the pixel data from the corresponding pixel in the source image after scaling by the scaling factors at 222. If the source image and the target image have different resolutions, then re-sampling of the source image may be performed by, for example, a bi-linear transformation, to determine the data for the target pixel.

At 224, it is determined if all the missing pixel data have been filled in or if all the data for the identified pixels has been replaced. If so, processing quits. If not, processing returns to step 212 until all the gaps or missing pixel data have been filled in or all the desired pixel data have been replaced.

Figure 5:
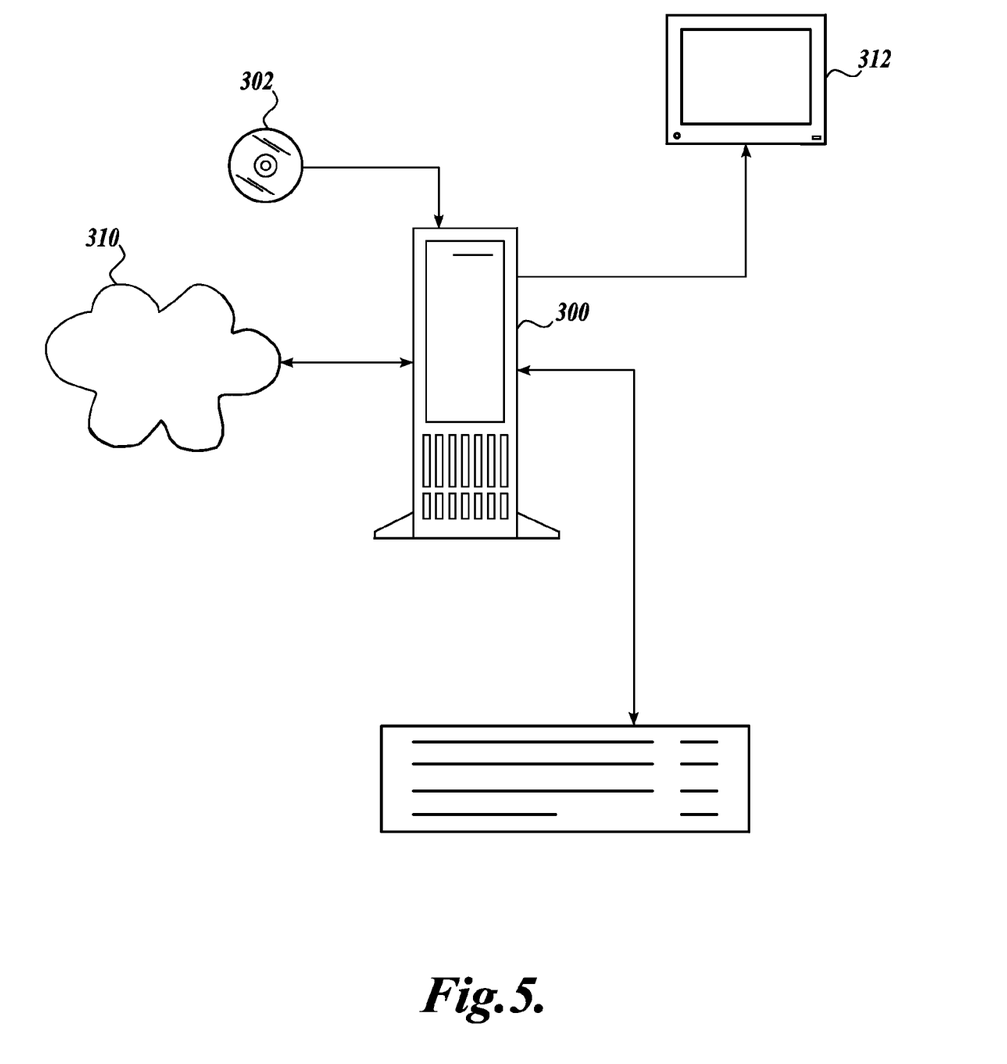
FIG. 5 illustrates a representative system for filling in and/or replacing pixel data in a target image in accordance with an embodiment of the disclosed technology.

FIG. 5 illustrates one representative computer system that can be used to implement the disclosed technology. A computer 300 includes one or more processors that execute a sequence of programmed instructions that cause the computer to fill in missing pixel data and/or to replace pixel data in a target image in accordance with the techniques described above. The instructions for the processor(s) may be stored on a computer storage media 302 such as a CD ROM, flash drive, hard drive, etc., or a remote computer (not shown) that is in communication with the computer 300 via a wired or wireless connection to a communication network such as the Internet 310. The computer 300 receives the source and target images from a computer storage media, camera memory card, or over a communication network and fills in missing pixel data and/or replaces pixel data as described. The processed images are displayed for a user on a video monitor or other display 312 and may be stored or transmitted to a remote location for analysis.

Figure 6A:
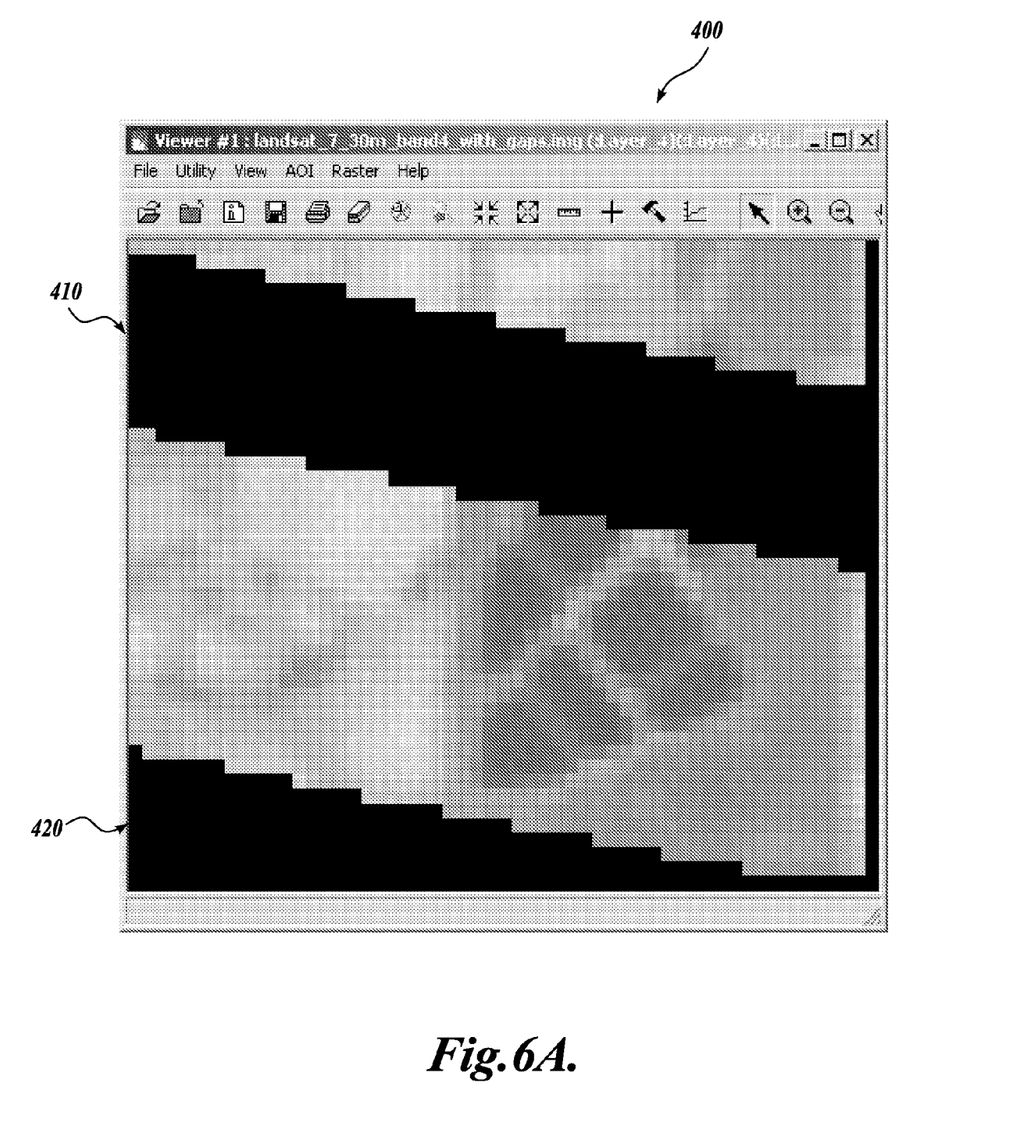
FIG. 6A illustrates a portion of an actual target image that is missing pixel data.
Figure 6B:
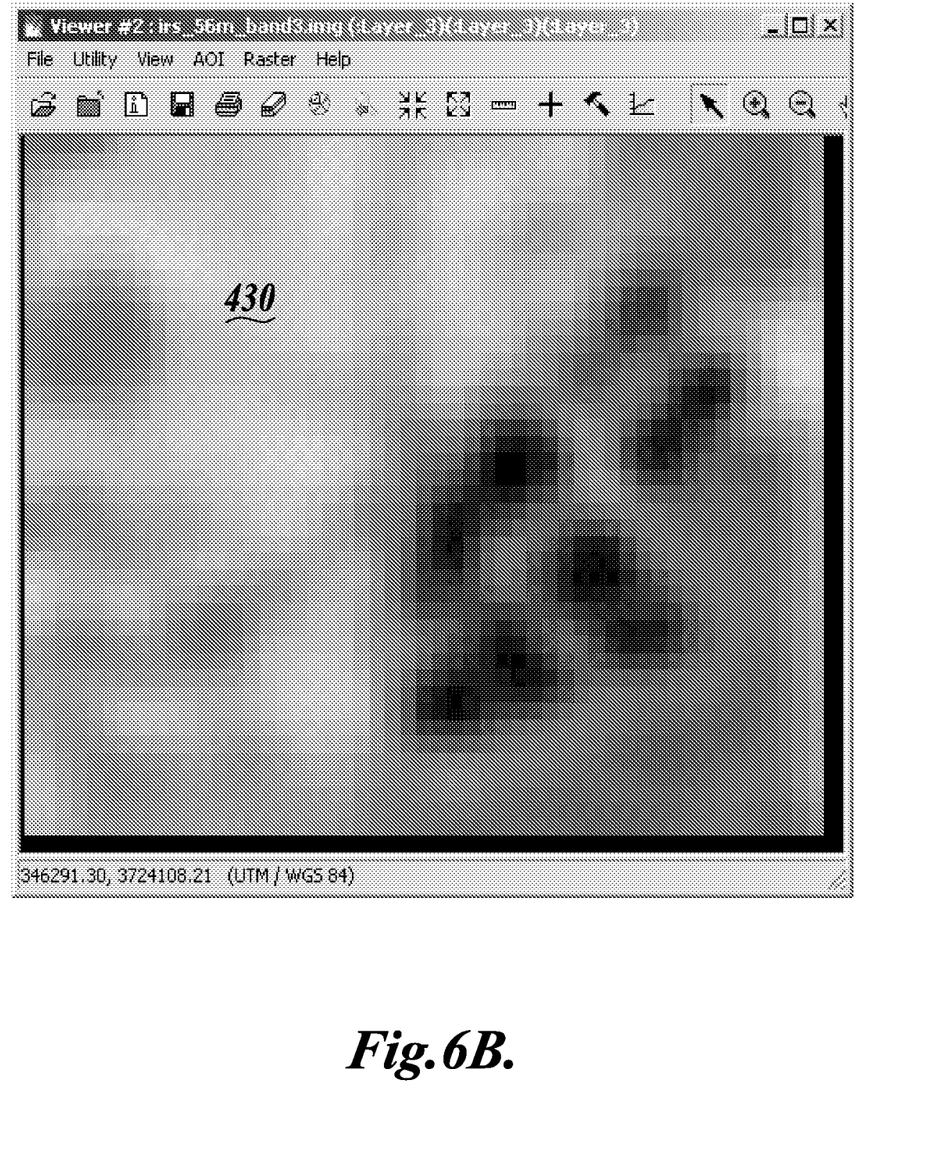
FIG. 6B illustrates a portion of an actual source image with valid data.
Figure 6C:
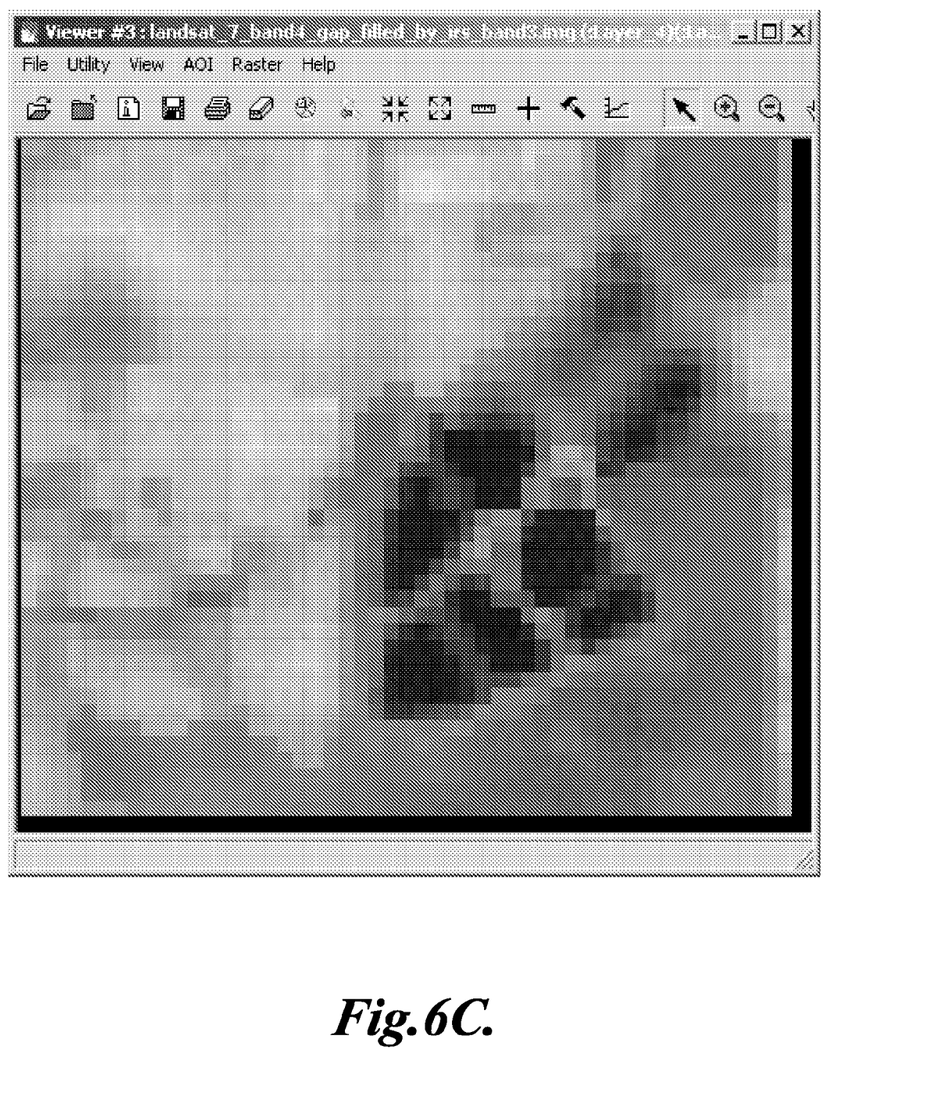
FIG. 6C illustrates the target image of FIG. 6A with data filled in from the source image.

FIG. 6A illustrates a portion of an actual target satellite image 400 of terrain having an area of valid pixel data and that is missing pixel data in band gaps 410 and 420. FIG. 6B illustrates a portion of an actual source image 430 of the same terrain that was captured with a different satellite system. FIG. 6C shows the same target image 400 of FIG. 6A with pixel data obtained from the source image 430 are used to fill the band gaps.

While illustrative embodiments have been illustrated and described, it will be appreciated that various changes can be made therein without departing from the scope of the invention as defined by the following claims and equivalents thereof.

The embodiments of the invention in which an exclusive property or privilege is claimed are defined as follows:

1. A non-transitory, computer storage media having stored thereon a sequence of program instructions that are executable by a computer system to perform a method of modifying pixel data in a target image, by:
   storing a target image of an object with one or more pixels having spectral data to be modified in a memory of the computer;
   storing a source image of the same object in a memory of the computer;
   classifying pixel spectral data in the source image to identify boundaries of local class areas each including a number of neighbouring pixels having similar spectral data values;
   determining boundaries of local class areas in the target image that correspond to the boundaries of the local class areas in the source image;
   determining a pixel in the target image having spectral data to be modified;
   identifying a replacement pixel in the source image having spectral data that will replace the spectral data for the pixel in the target image;
   identifying the boundaries of one or more additional local class areas in the source image that have groups of neighbouring pixels with spectral data that are classified in the same manner as the spectral data in the local class area that includes the replacement pixel;
   identifying the boundaries of one or more additional local class areas in the target image that correspond to the one or more additional local class areas in the source image;
   determining one or more scaling relationships between the pixel spectral data in the boundaries of the one or more additional local class areas in the target image with the pixel spectral data for pixels in the corresponding one or more additional local class areas in the source image; and replacing the spectral data for the pixel in the target image having spectral data to be modified with the spectral data for the replacement pixel in the source image using the determined one or more scaling relationships.

2. A system for modifying pixel data in a target image, comprising:

a memory configured to store a source image along with boundaries of local class areas in the source image each having a group of neighbouring pixels that have been classified as having similar spectral values and a target image and boundaries of local class areas in the target image that correspond to the boundaries of the local class areas in the source image;

a processor that is configured to execute a program to:

determine a pixel in the target image having spectral data to be modified;

identify a replacement pixel in the source image having spectral data that will replace the spectral data for the pixel in the target image;

identify the boundaries of one or more additional local class areas in the source image that have groups of neighbouring pixels with spectral data that are classified in the same manner as the spectral data in the local class area that includes the replacement pixel;

identify the boundaries of one or more additional local class areas in the target image that correspond to the one or more additional local class areas in the source image;

determine one or more scaling relationships between the pixel spectral data in the boundaries of the one or more additional local class areas in the target image with the pixel spectral data for pixels in the corresponding one or more additional local class areas in the source image; and replace the spectral data for the pixel in the target image having spectral data to be modified with the spectral data for the replacement pixel in the source image using the determined one or more scaling relationships.

* * * * *